United States Patent
Liu et al.

(10) Patent No.: US 6,751,315 B1
(45) Date of Patent: Jun. 15, 2004

(54) HIGH BANDWIDTH PHONE LINE TRANSCEIVER WITH CAPACITOR ISOLATION

(75) Inventors: Zhenyn Lawrence Liu, Pleasanton, CA (US); Gerald J. Yurgelites, Pleasanton, CA (US)

(73) Assignee: Silicon Labs Isolation, Inc., Austin, TX (US)

(*) Notice: Subject to any disclaimer, the term of this patent is extended or adjusted under 35 U.S.C. 154(b) by 0 days.

(21) Appl. No.: 09/419,583

(22) Filed: Oct. 18, 1999

(51) Int. Cl.⁷ .......................... H04M 1/00; H04M 9/00; H04M 9/08; H04M 11/06
(52) U.S. Cl. .............................. 379/413.02; 379/93.05; 379/394; 379/399.01; 379/403; 379/415; 370/494; 370/497; 370/488
(58) Field of Search ................... 379/92.04, 93.01, 379/93.05, 93.06, 380, 386, 391, 394, 395, 399.01, 399.02, 402, 403, 413.02, 413.04, 406.01, 406.06, 414, 415; 370/493, 494, 495, 496, 497, 480, 488

(56) References Cited

U.S. PATENT DOCUMENTS

| | | | |
|---|---|---|---|
| 5,323,460 A * | 6/1994 | Warner et al. | 379/399.01 |
| 5,500,895 A | 5/1996 | Yurgelites | 379/412 |
| 5,528,630 A * | 6/1996 | Ashley et al. | 375/258 |
| 5,757,803 A * | 5/1998 | Russell et al. | 370/494 |
| 6,014,386 A * | 1/2000 | Abraham | 370/485 |
| 6,081,586 A * | 6/2000 | Rahamim et al. | 379/93.29 |
| 6,104,707 A * | 8/2000 | Abraham | 370/295 |
| 6,115,466 A * | 9/2000 | Bella | 379/399.01 |
| 6,137,880 A * | 10/2000 | Bella | 379/399.01 |
| 6,144,326 A * | 11/2000 | Krone et al. | 341/118 |
| 6,144,735 A * | 11/2000 | Bella | 379/399.01 |
| 6,169,762 B1 * | 1/2001 | Embree et al. | 375/220 |
| 6,289,070 B1 * | 9/2001 | Krone et al. | 375/377 |
| 6,298,133 B1 * | 10/2001 | Hein et al. | 379/399.01 |
| 6,323,796 B1 * | 11/2001 | Krone et al. | 341/143 |
| 6,351,530 B1 * | 2/2002 | Rahamim et al. | 379/399.01 |
| 6,359,973 B1 * | 3/2002 | Rahamim et al. | 379/93.05 |
| 6,393,110 B1 * | 5/2002 | Price | 379/93.01 |
| 6,407,987 B1 * | 6/2002 | Abraham | 370/295 |
| 6,442,213 B1 * | 8/2002 | Krone et al. | 375/285 |
| 6,456,712 B1 * | 9/2002 | Hein et al. | 379/399.01 |
| 6,498,825 B1 * | 12/2002 | Dupuis et al. | 375/377 |
| 6,504,864 B1 * | 1/2003 | Dupuis et al. | 375/220 |
| 6,507,606 B2 * | 1/2003 | Shenoi et al. | 375/211 |
| 6,516,024 B1 * | 2/2003 | Dupuis et al. | 375/220 |
| 6,519,339 B1 * | 2/2003 | Sacca et al. | 379/412 |
| 6,587,560 B1 * | 7/2003 | Scott et al. | 379/413.02 |
| 6,658,051 B1 * | 12/2003 | Liu | 375/222 |

* cited by examiner

Primary Examiner—Binh Tieu
(74) Attorney, Agent, or Firm—Harris Zimmerman

(57) ABSTRACT

A high bandwidth telephone line transceiver for connecting telecommunications equipment to a telephone line provides a pair of isolation capacitors connected to the telephone line to transmit the telephone signals across the requisite electrical isolation barrier. The capacitors are connected to a user-side hybrid circuit that provides a line impedance match for the telephone circuit, and converts the two wire connection to the capacitors to a 4 wire circuit for separate transmit and receive signal paths. The receive signal path extends through a signal op amp to a high pass filter that transmits the DSL download bandwidth and rejects the upload bandwidth and voice spectrum. The received signal is then fed to an analog/digital converter, and the digitized signal is connected to a DSP. The DSP is connected to a data handling device via a USB port, a PCI interface, or the like. The transmit signal path extends from the DSP circuit to a transmit path digital/analog converter. The resulting analog signal is fed through a low pass filter, which transmits the upload bandwidth and rejects the remainder of the spectrum. The signal then passes through a compensation network that maintains a flat impedance characteristic over the upload bandwidth, and then through a line impedance matching network to the other isolation capacitor that connects to the telephone line. The hybrid circuit also cancels the near echo from the transmit signal path to the receive signal path.

34 Claims, 3 Drawing Sheets

HIGH BANDWIDTH PHONE LINE TRANSCEIVER WITH CAPACITOR ISOLATION

BACKGROUND OF THE INVENTION

This invention relates to devices for connecting communications equipment to a telephone line across an electrical isolation barrier.

In the past few years the internet has progressed from a computer curiosity to an integral part of business and commerce and education. The number of homes in the United States connected to the internet is estimated to exceed 40 million in the year 2001. Many new subscribers to internet services have come to realize that although a universe of information and products and services are available via the internet, the service connections available to most users are severely limited in speed, due either to limited modem speed or the limitations of the communications line serving the modem. The slow response time and downloading delays that are commonly experienced by internet users are continually frustrating to internet users, who are accustomed to the faster reaction times of systems such as video games, remote control selection of television programming, cell phone connectivity, and the like.

The internet has flourished on the promise of future services, such as video on demand, video conferencing for telecommuting and on-line meetings, high quality audio programming, multi-casting, and the like. These features cannot be provided on a real-time basis using existing internet connections.

One solution to this bottleneck is video cable service, which is available to over 90% of homes, with over 60% of homes in the United States subscribing to a CATV service. Although coaxial cable has very high bandwidth, a major drawback of cable TV systems is that they are predominantly non-switched and non-directed; i.e., every customer connected to the cable receives substantially all of the traffic on the cable. If cable systems are modified to carry individual channels of communication for each subscriber, it will be necessary to devise a time domain multiplex scheme for cable traffic, or a plurality of subcarriers, or some other multiplex network communications arrangement that can address each subscriber individually. Network communications could fill a large portion of the cable bandwidth, particularly if the cable systems continue to carry hundreds of TV channels as well.

Other communications technologies, such as fiberoptics, also offer the promise of "unlimited" bandwidth. Although ten years ago there were predictions that every home would be connected to an optical fiber communications system by the year 2000, the magnitude of the task and the cost per home have combined to limit direct fiberoptic service to extremely high volume users. Rather, telephone companies have built fiberoptic networks across much of the country, but transfer the signals to the existing twisted pair copper wire circuits for transmission to the end user.

Ironically, the existing telephone system, unlike the cable TV systems and fiberoptic systems, does provide individually addressed communications circuits to each home (often more than one to each home). These circuits are typically formed by twisted pairs of copper wire, and are generally thought to have severe bandwidth limitations due to inductive losses over moderate distances, particularly as the frequency of the signal increases toward the upper end of the audio band. Indeed, plain old telephone service (POTS) provides voice circuits that are limited to 4 KHz bandwidth, and are terminated at the telephone company switch by an inductive terminator that enforces the 4 KHz limit. Standard analog modems must operate within this bandwidth restriction, and 56 Kbps appears to be the technical and physical limit to communications speed using this bandwidth.

A new technology has been devised to exploit the unused bandwidth that is available via the twisted copper pair network that now exists. Asynchronous Digital Subscriber Line (ADSL) takes advantage of the fact that a twisted copper pair may transmit a usable signal up at 1.5 Mbps for 2–3 miles from the telephone company switch, under normal conditions. ADSL permits simultaneous voice and internet traffic on the same twisted copper pair circuit by reserving the 0–4 KHz band for voice traffic. Bandpass filters, or "splitters" are placed in the circuit to separate the voice spectrum from the data spectrum. For data downloading, a plurality of subcarriers, each having a 4 KHz bandwidth, are transmitted in the 140 KHz–1 MHz band, each being independently modulated with the data signal and carrying up to 15 bits/sec per Hz. For data uploading, a plurality of subcarriers are transmitted in the 20–130 KHz band, the carrier bandwidth and modulation being similar to the upload spectrum. The technical details of ADSL are set forth in the ANSI T1.413 standard. A variant of this technology, termed Universal ADSL or DSL LITE, requires no splitter for voice service, and reduces the upload bandwidth to 140–550 KHz. This latter variant provides most of the advantages of DSL, such as high data rates for data uploads and downloads, without requiring the installation cost and hardware cost of a splitter at the customer premises.

At the receiver end of the telephone circuit, a DSL modem is connected to receive and transmit upload and download signals in the appropriate DSL format. The modem must provide a high bandwidth connection while also maintaining a required electrical isolation barrier between the telephone line and the user equipment. The baseline technology for transmission across an electrical isolation barrier is an isolation transformer.

In U.S. Pat. No. 5,500,895, issued to Gerald Yurgelites, there is described a method and apparatus for transmitting communications signals across an electrical isolation barrier. One example of this invention is the transmission of telecommunications signals across the isolation barrier that is required between a telephone network and any telephonic device (telephone, facsimile machine, modem, and the like). This invention employs paired capacitors connected across the isolation barrier, and differentially charges the paired capacitors to deliver the signal across the barrier without breaching the isolation that the barrier provides. In this arrangement, there is provided a line-side circuit that communicates with a user-side circuit through a plurality of paired capacitors. The separated circuits (sold as a two chip set) handle the transmit, receive, and tip/ring signals and convert them to differential charges for transmission across respective paired capacitors. The line-side circuit is powered by the telephone circuit, and the user-side circuit is powered by the user device (modem, fax machine, telephone, etc.).

Although this technology is superior to isolation transformer arrangements for virtually all previous applications, it is not well suited to DSL applications. It would be advantageous to eliminate the line-side device entirely, both to reduce cost and to reduce signal attenuation caused by the power requirements of the line-side device. However, there remains a need to convert the two-line telephone circuit to a four line transmit/receive circuit for proper signal handling.

SUMMARY OF THE INVENTION

The present invention generally comprises a high bandwidth telephone line transceiver for connecting telecommunications equipment to a telephone line across an electrical isolation barrier. A salient aspect of the invention is the elimination of isolation transformers, and the elimination of a line-side circuit for delivering signals to the user-side telecommunications equipment.

The invention provides one pair of isolation capacitors connected to the telephone line to transmit the telephone signals across the electrical isolation barrier, and provides at least 1000 VDC (up to 5000 VDC, depending on the jurisdiction) of isolation. The capacitors are connected to a user-side hybrid circuit that provides a line impedance match for the telephone circuit. The hybrid circuit also converts the two wire connection to the capacitors to a 4 wire circuit for separate transmit and receive signal paths.

The receive signal path derives a signal from one of the isolation capacitors, and feeds the signal through a signal op amp to a high pass filter that transmits the DSL download bandwidth and rejects the upload bandwidth and voice spectrum. The received signal is then fed to an analog/digital converter, and the digitized signal is connected to a digital signal processor, such as a DSP integrated circuit known in the prior art. The DSP circuit is connected to a modem, fax machine, network, or other data handling device via a USB port, a PCI interface, or the like.

The transmit signal path extends from the DSP circuit to a transmit path digital to analog converter. The resulting analog signal is fed through a low pass filter, which transmits the upload bandwidth and rejects the remainder of the spectrum. The signal then passes through a compensation network that maintains a flat impedance characteristic over the upload bandwidth, and then through a line impedance matching network to the other isolation capacitor that connects to the telephone line.

Due to the fact that the isolation capacitor impedance changes with frequency, particularly in the low frequency upload (transmit) band, it is necessary to employ the compensation network to flatten the impedance characteristic among all the subcarriers used in the upload band. The compensation network includes a balanced op amp that receives signal inputs from the low pass filter, and includes an RC feedback loop from each output to the respective input port. The RC values are chosen so that the output voltage of the circuit substantially tracks the line voltage of the telephone circuit across the isolation capacitors. This result is not affected by impedance changes with frequency, nor is it affected by differences in the ground voltage levels between the telephone circuit and the user equipment.

The hybrid circuit connects each receive signal input to a respective line out port through an RC series combination, and a resistor connects each receive signal input to the other line out port. This combination not only transmits the telephone signal to the receive signal inputs, it also cancels the near echo from the transmit portion of the circuit.

The high bandwidth transceiver of the invention eliminates the use of an isolation transformer, thereby eliminating a bulky component that radiates EMI like an antenna and generates heat. Transformers also may distort the telephone signal, due to inductance effects and possible magnetic coil saturation. The transceiver, on the other hand, may be realized as a small integrated circuit that may be surface mounted, with far less heat generation, far less EMI noise, and a far smaller area profile on a PCB.

The transceiver of the invention also eliminates the requirement for any electronic circuit to the telephone line side of the isolation barrier. All of the active components in the transceiver circuitry are connected only to the user side of the telephone line, with the exception of the pair of isolation capacitors that transfer the signals across the isolation barrier. There is no telephone side circuit drawing power from the telephone line. Thus the cost is diminished, and signal attenuation is also reduced.

DESCRIPTION OF THE PREFERRED EMBODIMENT

Figure 1:
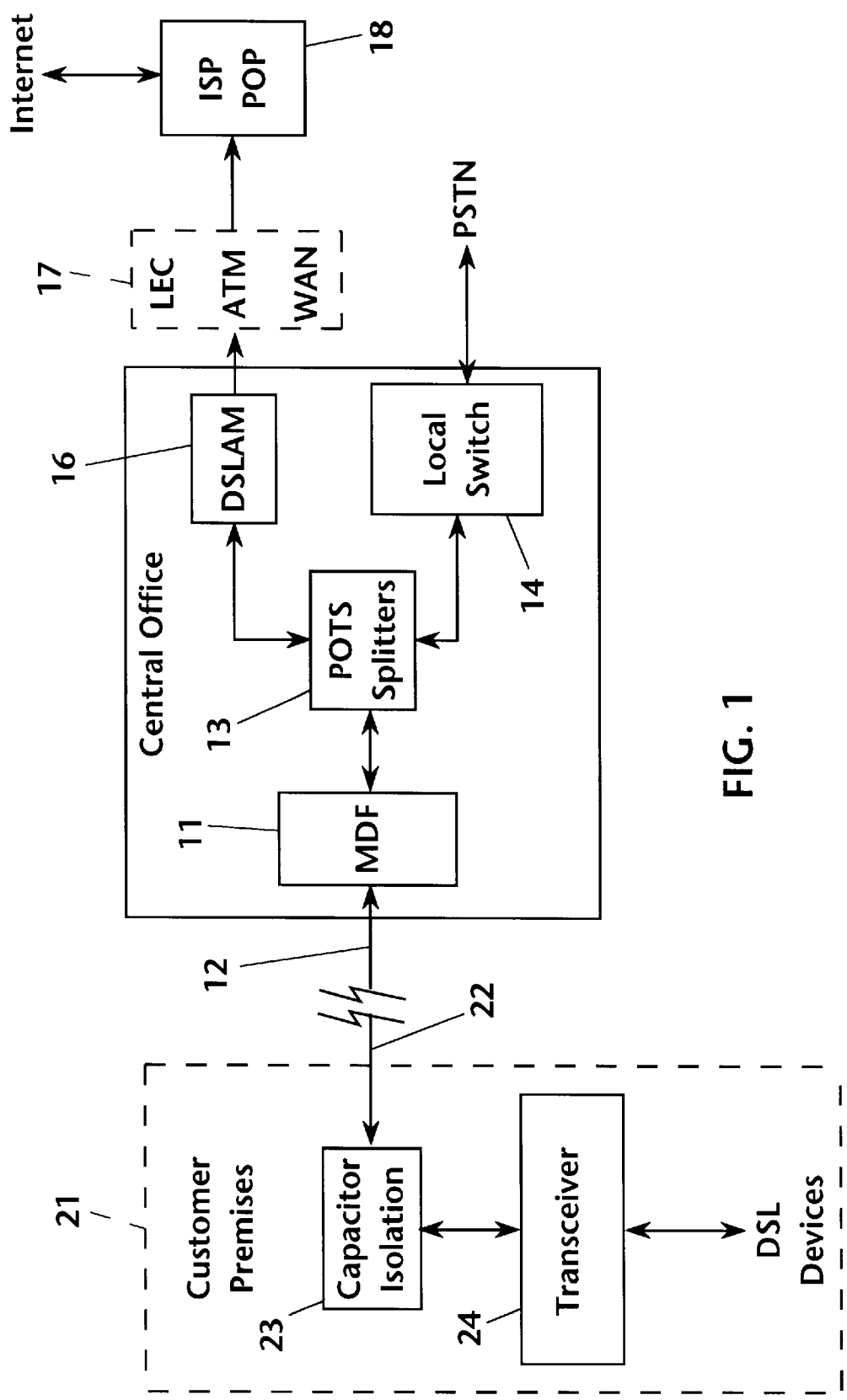
FIG. 1 is a functional block diagram of a typical telephone service arrangement for ADSL communications, showing the role of the transceiver of the present invention.

The present invention generally comprises a high bandwidth telephone line transceiver for connecting telecommunications equipment to a telephone line across an electrical isolation barrier. In particular, one significant use of the invention involves connection to a telephone line carrying DSL data communications, including variants of DSL that conform generally with ANSI T1.413 standard and its equivalents. With regard to FIG. 1, a telephone company local office includes an MDF 11 connected to telephone circuits 12. The MDF is connected to a POTS (plain old telephone service) Splitter 13, which directs all voice band signals to the Local Switch 14, and thence to the PSTN (public switched telephone network). The splitter 13 directs all DSL signals to a DSLAM (digital subscriber line modem) 16 that connects via a local exchange carrier (LEC) 17, a wide area network (WAN) or the local carrier's ATM backbone to an ISP POP 18. Thus the DSL signals are connected via high bandwidth circuits to the internet, and this continuous connection does not require dial-up or sign-on for data exchange with the internet. It is noted that the DSL signals do not traverse the central office local switch. This central office arrangement is typical in the prior art.

At the customer premises 21, the telephone circuit terminates typically in a twisted copper wire pair 22. The wire circuit 22 is connected via capacitor isolation 23 to the transceiver 24 of the invention, so that DSL communications signals are transferred to and from the telephone circuit across the required electrical isolation barrier that must be maintained between the customer premises equipment 21 and the line 22. The transceiver 24 connects to DSL devices, such as an internal or external DSL modem that is typically connected to a computer system. For high rate ADSL, the customer premises may include a splitter connected to the capacitor isolation 23 to direct voice band calls directly to voice band equipment, and DSL signals to the Transceiver 24.

Figure 2:
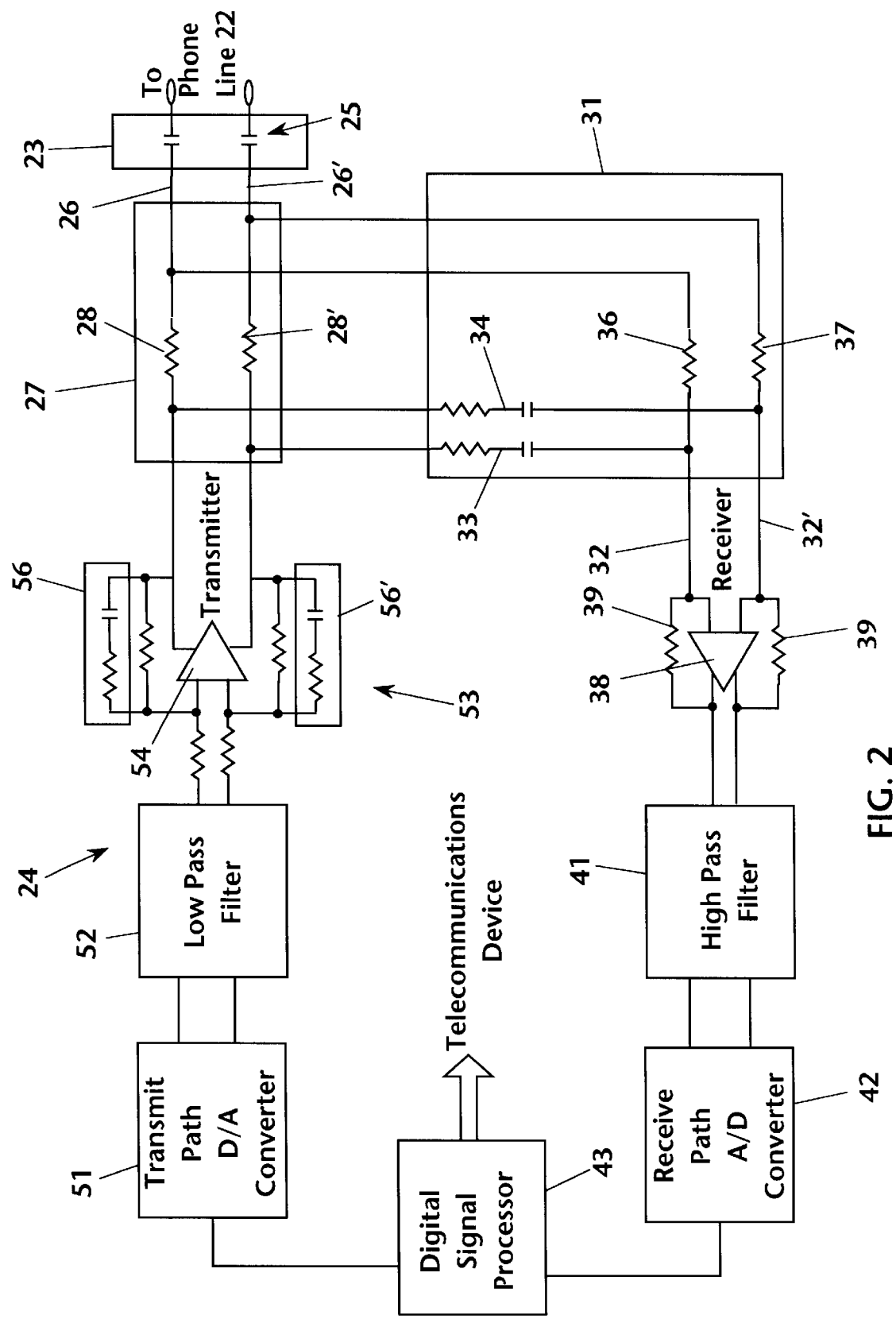
FIG. 2 is a functional block diagram of the high bandwidth phone line transceiver of the invention, including its connection to a telephone line.

With regard to FIG. 2, the capacitor isolation circuit 23 includes two isolation capacitors 25 connected directly to the phone line 22 and leading to signal lines 26 and 26'. The isolation capacitors 25 transmit the telephone signals across the electrical isolation barrier, and provides at least 1000 VDC (up to 5000 VDC) of isolation. In order to match the 100Ω impedance of a typical telephone circuit, the transceiver 24 includes a line impedance matching section 27, comprised of two load resistors 28 and 28' interposed in each signal line 26 and 26', respectively.

The transceiver 24 includes a 2 to 4 wire hybrid converter section 31 which includes receive signal lines 32 and 32'. Signal line 32 is connected through series RC combination 33 to the device side of load resistor 28', and is connected through resistor 36 to the line side of load resistor 28. Likewise, signal line 32' is connected through series RC combination 34 to the device side of load resistor 28, and is connected through resistor 37 to the line side of load resistor 28'. This arrangement transmits the telephone signals from the capacitors 25 to receive signal lines 32 and 32', while also canceling the near echo from the transmitter portion of the transceiver 24.

Figure 3:
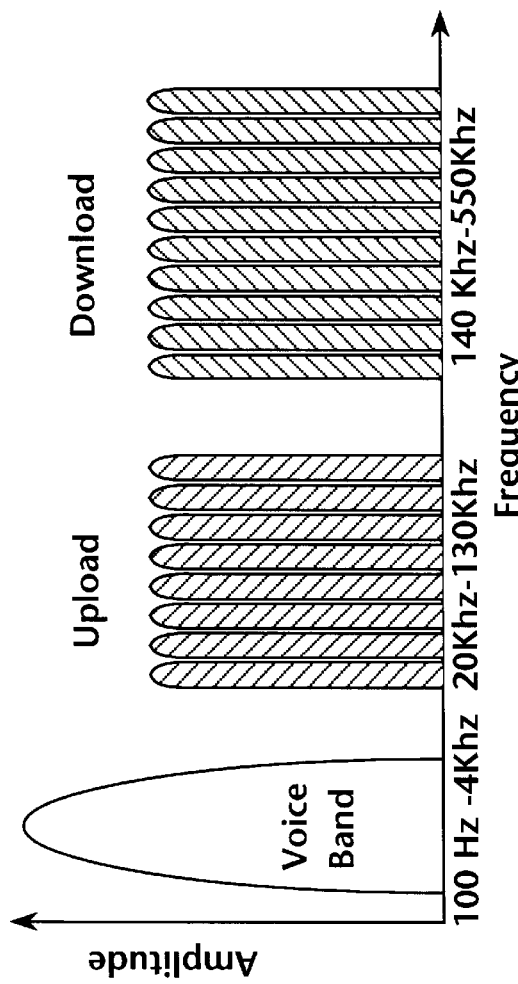
FIG. 3 is a chart depicting the spectrum utilization involved in DSL data communications.

The receive signal lines 32 and 32' are connected to a balanced op amp 38, which includes feedback loops 39 on each input/output pair. The amplified signals are fed to a high pass filter 41 that transmits the DSL download bandwidth and rejects the upload bandwidth and voice spectrum (see FIG. 3). The filtered signal is then conducted to a receive path analog/digital converter 42, and the digitized signal is fed to a digital signal processor 43. The signal processor 43 demodulates the download subcarrier signals and generates a composite data signal that is fed to telecommunications devices such as a modem, fax machine, network, or other data handling device via a USB port, a PCI interface, or the like.

The transmit signal path of the transceiver 24 extends from the digital signal processor 43 to a transmit path digital/analog converter 51, where the digital signal is transformed into its analog equivalent. The analog signal is then fed through a low pass filter 52 which transmits the upload bandwidth and rejects the remainder of the spectrum. The transmit signal is then conducted to a compensation network 53 which maintains a flat impedance characteristic over the upload bandwidth. The compensation network 53 includes a balanced op amp 54 that has RC networks 56 and 56' inserted in the gain adjusting feedback loops extending from each output to the respective input port. Each RC network matches the RC impedance of capacitor 25 and load resistor 28 (or 28'). The transmit signals are fed through the load resistors 28 and 28', and thence to the signal lines 26 and 26', and to the isolation capacitors 25.

Figure 4:
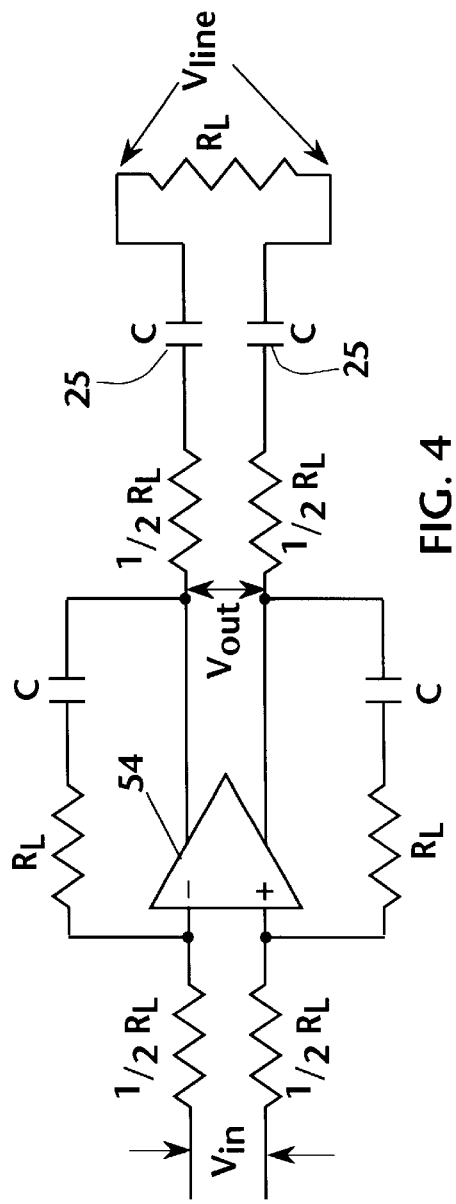
FIG. 4 is a schematic representation of the impedance flatness compensation network of the invention.

With reference to the equivalent circuit schematic of FIG. 4, the telephone line voltage $V_{line}$, appears across $R_L$, the line impedance of a standard telephone line, which is typically 100Ω. The load resistors 28, 28' are typically ½$R_L$, or 50Ω. The circuit values are chosen so that the feedback loop impedance for each signal path through op amp 54 includes a resistance component equal to $R_L$ and a capacitance value equal to isolation capacitor 25. The input path resistors are equal in value to ½$R_L$. Given these values, the relationship between the output voltage $V_{out}$, and the input voltage $V_{in}$ from the low pass filter 52 is given by the equation:

$$V_{out} = \frac{R_L + Z_C}{1/2R_L} \cdot V_{in}$$

Likewise, the input voltage is related to the line voltage according to the equation:

$$V_{line} = \frac{R_L}{2R_L + 2Z_C} \cdot V_{out} = \frac{R_L}{2R_L + 2Z_C} \cdot \frac{R_L + Z_C}{1/2R_L} \cdot V_{in} = V_{in}$$

Thus the input voltage of the transmit signal path is matched to the telephone line voltage as delivered by the capacitors 25, indicating that the proper choice of component values yields a transmit impedance characteristic that is flat; i.e., independent of the different frequencies of the upload subcarriers in the DSL arrangement. Thus the capacitive reactance of the isolation capacitors is neutralized by the compensation network 53.

The transceiver 24 may be fabricated as a single integrated circuit, or as an integrated circuit used in combination with a separate DSP chip 43. The transceiver 24 occupies a very small area on a printed circuit board, and completely eliminates the telephone isolation transformer used heretofore. In this regard, the transceiver eliminates a source of radiated EMI and heat, and provides better signal handling across the isolation barrier than the inductive path of the isolation transformer.

In addition, the transceiver 24 obviates the use of any electronic circuit on the telephone line side of the isolation barrier at the customer premises. All circuit power is derived from the customer equipment, so there is no power drain nor signal attenuation on the telephone line signal.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

What is claimed is:

1. A high bandwidth telephone line transceiver assembly for connecting telecommunications equipment across an electrical isolation barrier of at least 1000VDC to a telephone line, including:
    a pair of isolation capacitors connected to the telephone line across the isolation barrier to conduct high bandwidth signals to and from the telephone line;
    a high bandwidth transceiver circuit having bidirectional signal lines connected to said pair of isolation capacitors;
    said transceiver circuit having no telephone line side circuitry and requiring no operating power from said telephone line; and,
    means for connecting said transceiver circuit to a high data rate telecommunications device.

2. The high bandwidth telephone line transceiver assembly of claim 1, wherein said transceiver circuit includes a load resistance connected to said bidirectional signal lines to balance the line resistance of the telephone line.

3. The high bandwidth telephone line transceiver assembly of claim 2, further including a 2 wire/4 wire hybrid circuit connected to said bidirectional signal lines to define a pair of transmit signal lines and a pair of receive signal lines connected to said bidirectional signal lines.

4. The high bandwidth telephone line transceiver assembly of claim 3, further including means for canceling the near echo effect from said transmit signal lines to said receive signal lines.

5. The high bandwidth telephone line transceiver assembly of claim 3, wherein said receive signal lines are connected to a high pass filter, said high pass filter having a passband for transmitting data signals from the telephone line and rejecting the remainder of the spectrum.

6. The high bandwidth telephone line transceiver assembly of claim 5, wherein said passband corresponds to the download bandwidth of a digital subscriber line (DSL) service.

7. The high bandwidth telephone line transceiver assembly of claim 5, wherein the output of said high pass filter is connected to a receive path analog/digital converter.

8. The high bandwidth telephone line transceiver assembly of claim 7, wherein the output of said analog digital converter is connected to a digital signal processor.

9. The high bandwidth telephone line transceiver assembly of claim 8, wherein said means for connecting said transceiver circuit includes a data bus connected between said digital signal processor and the high data rate telecommunications device.

10. The high bandwidth telephone line transceiver assembly of claim 3, wherein said load resistance includes a pair of resistors connected in series to said bidirectional signal lines.

11. The high bandwidth telephone line transceiver assembly of claim 10, wherein said pair of resistors each are equal to one-half the line resistance of the telephone line.

12. The high bandwidth telephone line transceiver assembly of claim 10, wherein said 2 wire/4 wire hybrid circuit includes a pair of series RC networks, each connected from one of said load resistances to one of said receive signal lines.

13. The high bandwidth telephone line transceiver assembly of claim 11, wherein said 2 wire/4 wire hybrid circuit includes a pair of resistors, each connected between one of said bidirectional signal lines and one of said receive signal lines.

14. The high bandwidth telephone line transceiver assembly of claim 5, further including a balanced op amp interposed between said receive signal lines and said high pass filter.

15. The high bandwidth telephone line transceiver assembly of claim 3, wherein a transmit signal path includes a digital signal processor for generating a digital data communications signal, and means for delivering the data communications signal to said isolation capacitors and to said telephone line.

16. The high bandwidth telephone line transceiver assembly of claim 15, wherein said means for delivering includes a transmit path digital/analog signal for generating an analog signal equivalent of said digital data communications signal.

17. The high bandwidth telephone line transceiver assembly of claim 16, wherein said means for delivering includes a low pass filter connected to the output of said digital/analog converter, said low pass filter having a transmit passband for passing data signals to the telephone line and rejecting the remainder of the spectrum.

18. The high bandwidth telephone line transceiver assembly of claim 17, wherein said transmit passband corresponds to the upload bandwidth of a digital subscriber line (DSL) service.

19. A high bandwidth telephone line transceiver assembly for connecting telecommunications equipment across an electrical isolation barrier to a telephone line, including:
   a pair of isolation capacitors connected to the telephone line across the isolation barrier to conduct high bandwidth signals to and from the telephone line;
   a transceiver circuit having bidirectional signal lines connected to said pair of isolation capacitors;
   an impedance compensation network interposed between said low pass filter output and a load resistance, said impedance compensation network including means for generating an output impedance characteristic for said transmit signal lines that is substantially constant across said transmit passband; and,
   means for connecting said transceiver circuit to a high data rate telecommunications device.

20. The high bandwidth telephone line transceiver assembly of claim 19, wherein said means for generating an output impedance includes a balanced op amp connected between said low pass filter and said load resistance.

21. The high bandwidth telephone line transceiver assembly of claim 20, further including a gain adjusting feedback loop connected between each output and respective input of said balanced op amp.

22. The high bandwidth telephone line transceiver assembly of claim 21, wherein said feedback loop includes an RC network.

23. The high bandwidth telephone line transceiver assembly of claim 22, wherein the values of said RC network are selected to neutralize the impedance of said isolation capacitors and said load resistance.

24. The high bandwidth telephone line transceiver assembly of claim 23, wherein said receive signal lines are connected to a high pass filter, said high pass filter having a receive passband for passing data signals from the telephone line and rejecting the remainder of the spectrum.

25. The high bandwidth telephone line transceiver assembly of claim 24, wherein said receive passband corresponds to the download bandwidth of a digital subscriber line (DSL) service.

26. The high bandwidth telephone line transceiver assembly of claim 24, wherein the output of said high pass filter is connected to a receive path analog/digital converter.

27. The high bandwidth telephone line transceiver assembly of claim 26, wherein the output of said analog/digital converter is connected to said digital signal processor.

28. The high bandwidth telephone line transceiver assembly of claim 27, wherein said means for connecting said transceiver circuit includes a data bus connected between said digital signal processor and the high data rate telecommunications device.

29. The high bandwidth telephone line transceiver assembly of claim 28, wherein said load resistance includes a pair of resistors connected in series to said bidirectional signal lines.

30. The high bandwidth telephone line transceiver assembly of claim 29, wherein said 2 wire/4 wire hybrid circuit includes a pair of series RC networks, each connected from one of said load resistances to one of said receive signal lines.

31. A high bandwidth telephone line transceiver assembly for connecting telecommunications equipment across an electrical isolation barrier to a telephone line, including:
   a pair of isolation capacitors connected to the telephone line across the isolation barrier to conduct high bandwidth signals to and from the telephone line;
   a transceiver circuit having bidirectional signal lines connected to said pair of isolation capacitors;
   an impedance compensation network interposed between said low pass filter output and a load resistance, said impedance compensation network including means for neutralizing the reactive component of the impedance of said pair of isolation capacitors; and, means for connecting said transceiver circuit to a high data rate telecommunications device.

32. The high bandwidth telephone line transceiver assembly of claim 31, wherein said impedance compensation network includes a balanced op amp connected between said low pass filter and said load resistance.

33. The high bandwidth telephone line transceiver assembly of claim 32, further including a gain adjusting feedback loop connected between each output and respective input of said balanced op amp.

34. The high bandwidth telephone line transceiver assembly of claim 33, wherein said feedback loop includes an RC network and the values of said RC network are selected to neutralize the reactance of said isolation capacitors.

* * * * *